United States Patent [19]

Nilsson et al.

[11] Patent Number: 4,468,187

[45] Date of Patent: Aug. 28, 1984

[54] APPARATUS FOR PRODUCING A TUBULAR ARTICLE HAVING AN ANNULAR GROOVE THEREIN

[75] Inventors: Claes T. Nilsson, Löddeköpinge; Kjell M. Jakobsen, Skanör; Lars G. Larson, Höör, all of Sweden

[73] Assignee: PLM A.B., Malmo, Sweden

[21] Appl. No.: 415,014

[22] Filed: Sep. 7, 1982

Related U.S. Application Data

[62] Division of Ser. No. 266,849, May 26, 1981, Pat. No. 4,416,927.

[30] Foreign Application Priority Data

May 29, 1980 [SE] Sweden .................................. 8004003

[51] Int. Cl.³ ............................................. B29C 17/02
[52] U.S. Cl. ..................................... 425/363; 425/367; 425/385; 425/392; 425/393; 425/DIG. 218
[58] Field of Search ............... 264/291, 293, 292, 310, 264/312, 322, 320; 425/385, 392, 393, 363, 367, DIG. 218

[56] References Cited

U.S. PATENT DOCUMENTS

| | | | |
|---|---|---|---|
| 1,641,815 | 9/1927 | Kauffman | 264/310 |
| 1,902,573 | 3/1933 | Neidich | 264/293 |
| 3,728,059 | 4/1973 | de Putter | 425/393 |
| 3,939,243 | 2/1976 | Dawson | 264/322 |
| 3,998,919 | 12/1976 | Urquhart | 264/322 |
| 4,083,918 | 4/1978 | Ronden et al. | 264/322 |
| 4,212,204 | 7/1980 | Amand | 264/291 |

Primary Examiner—James B. Lowe
Attorney, Agent, or Firm—Roberts, Spiecens & Cohen

[57] ABSTRACT

A tubular article having a peripheral groove is formed by providing the groove in the wall of a tubular blank made of thermoplastic material such as polyethylene terephthalate by applying simultaneously a pressure against the wall of the blank and axial stretching forces. In the bottom of the groove the material is drawn to yielding and the blank is simultaneously elongated.

6 Claims, 11 Drawing Figures

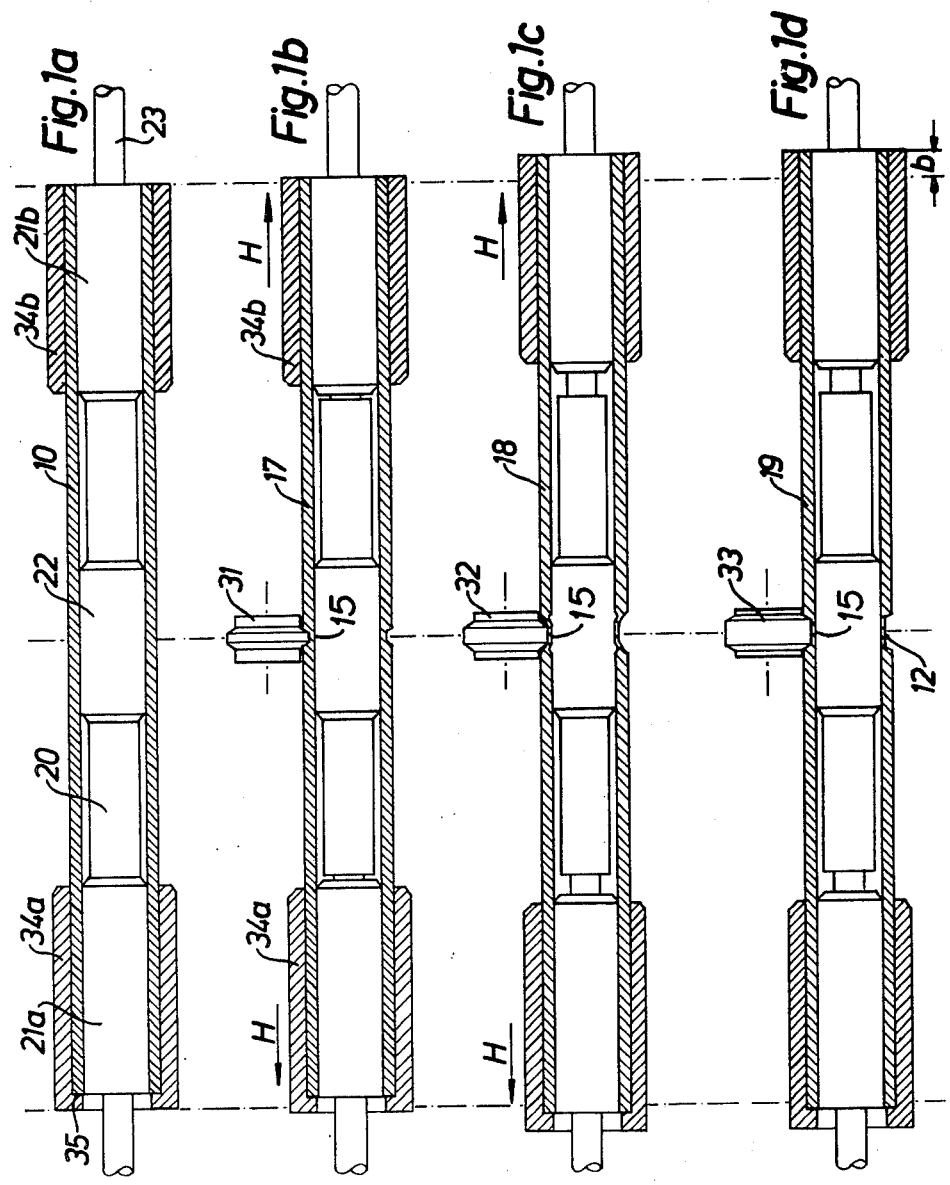

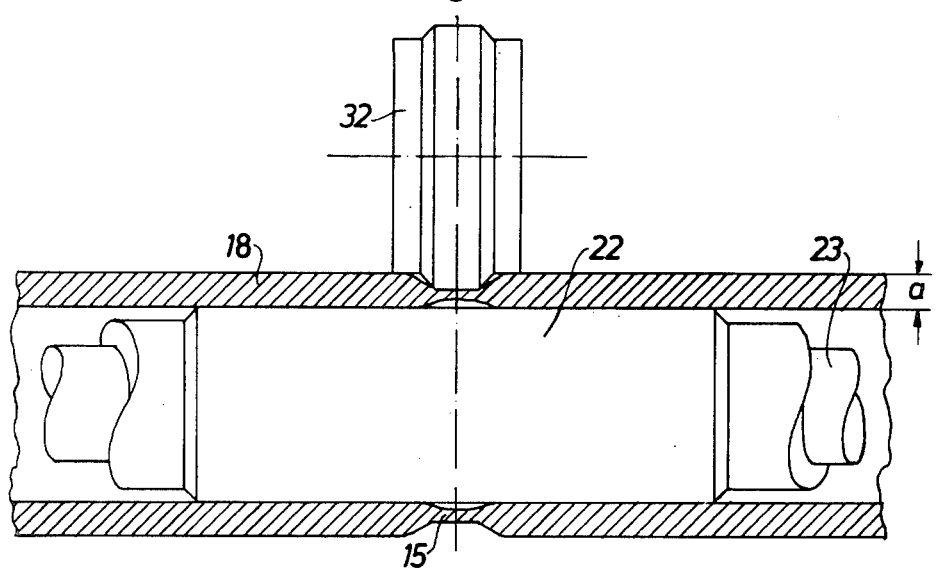
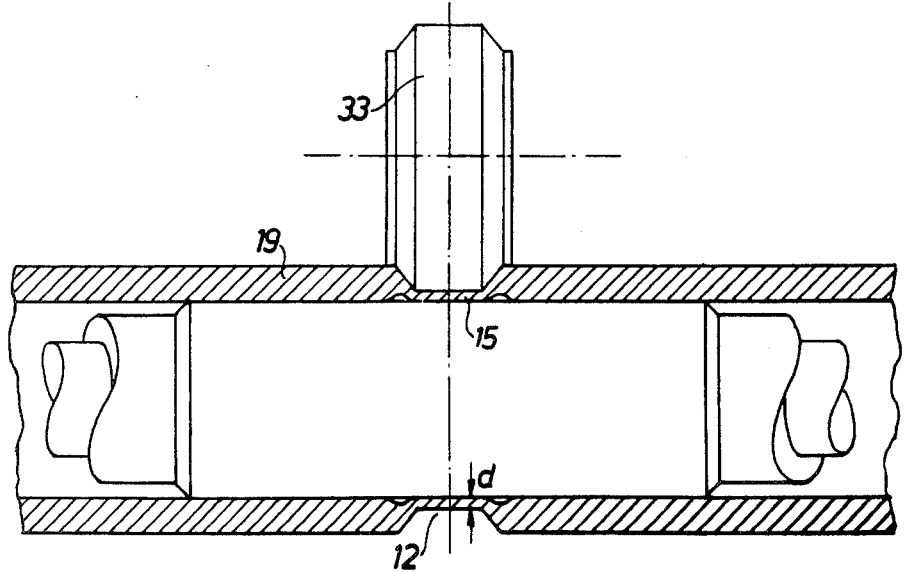

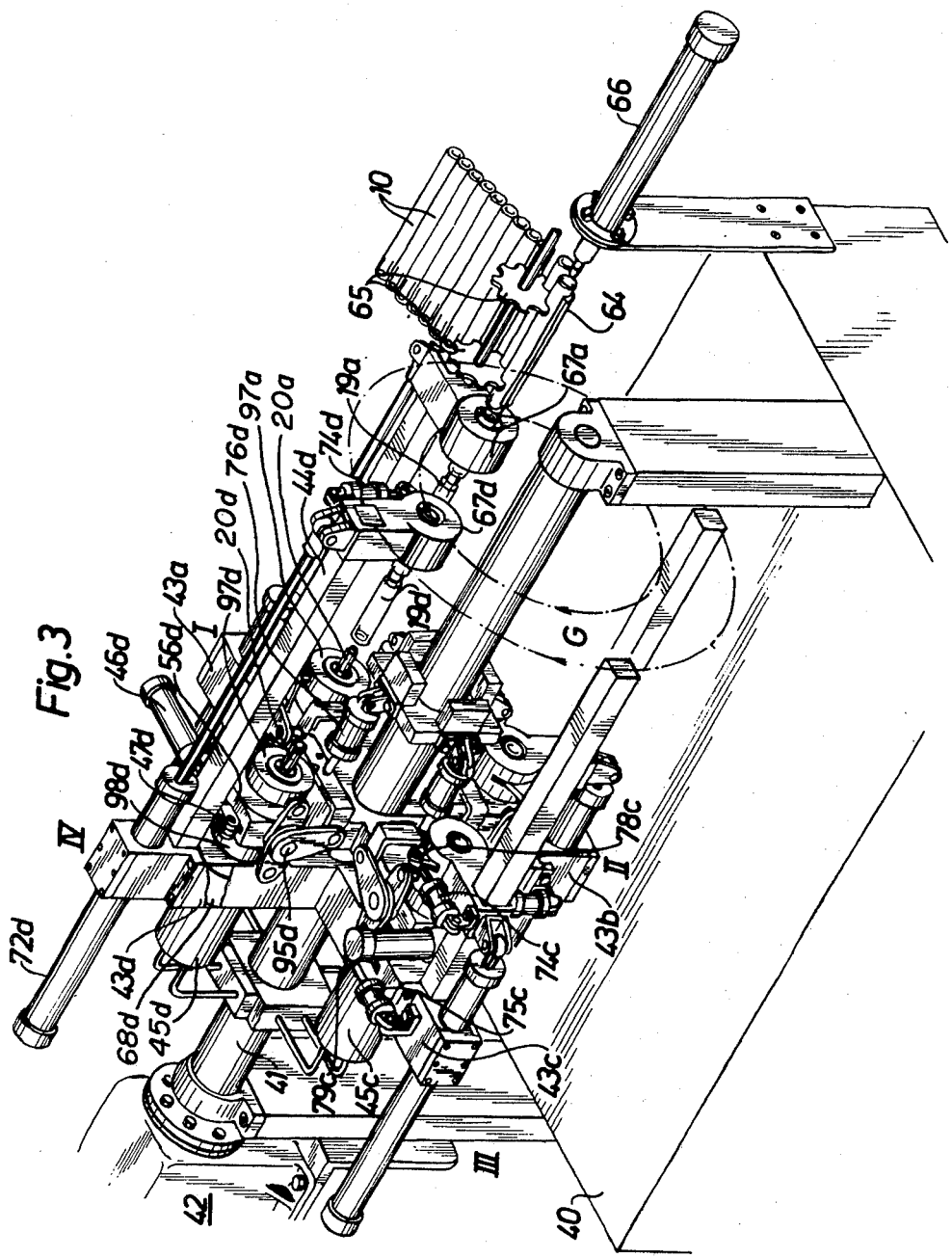

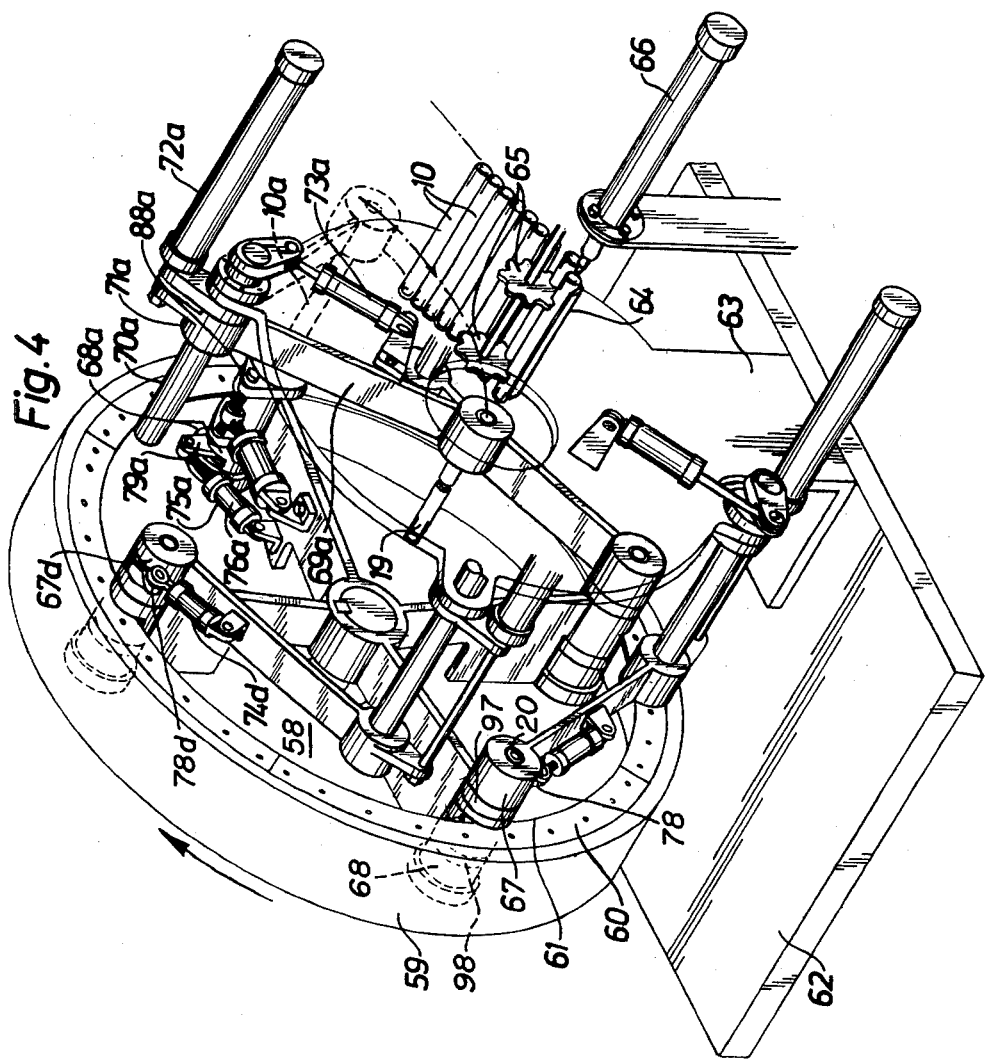

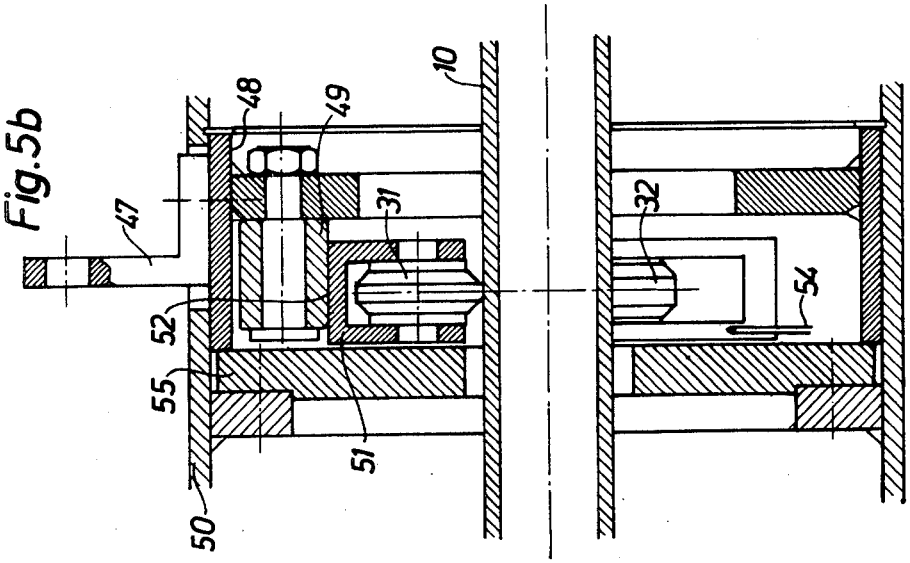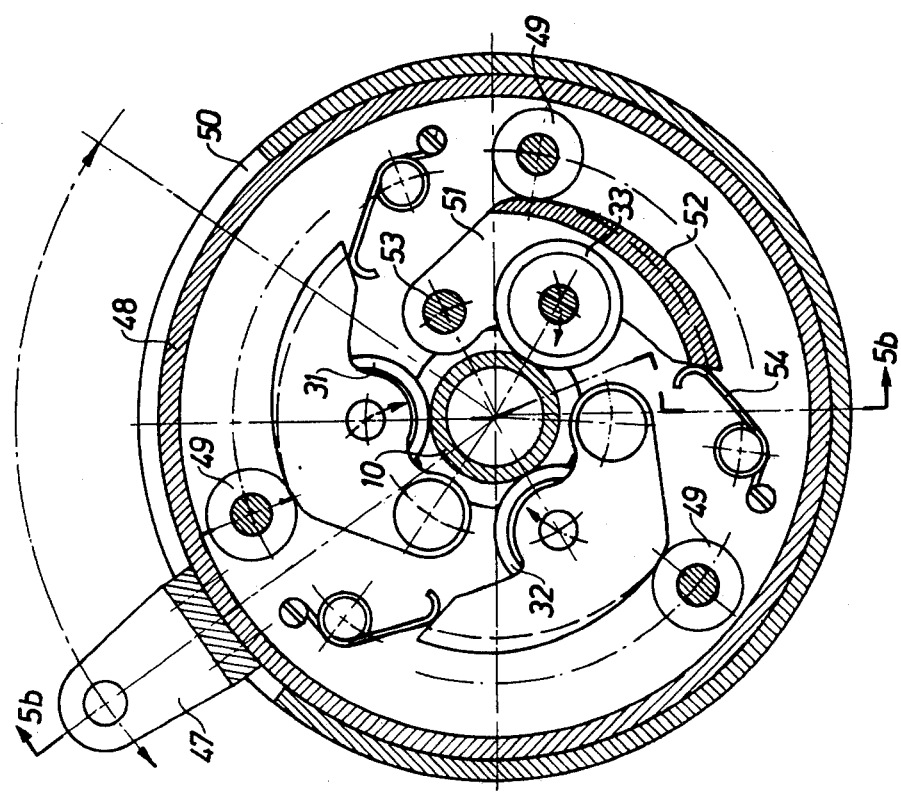

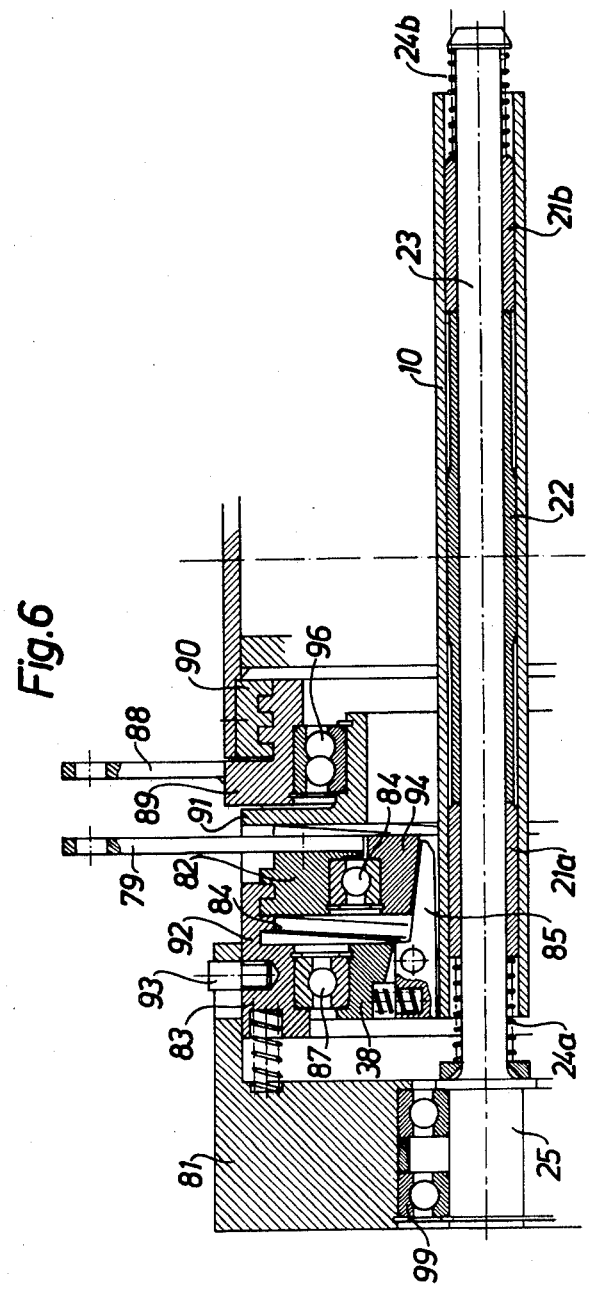

APPARATUS FOR PRODUCING A TUBULAR ARTICLE HAVING AN ANNULAR GROOVE THEREIN

This application is a division of application Ser. No. 266,849, filed May 26, 1981, now U.S. Pat. No. 4,416,927.

FIELD OF THE INVENTION

This invention relates to apparatus for producing a tubular article made of polyethylene terephthalate or a similar material having a wall consisting of mostly amorphous material, with a peripheral groove in the article wall arranged in such a way that the thickness of the material at the bottom of the groove is reduced relative to the rest of the wall.

SUMMARY OF THE INVENTION

The present invention shows how a tubular blank made of polyethylene terephthalate or similar material can be converted into an object consisting either in whole or in part of monoaxially-oriented material. During conversion, the transition zones between the amorphous material and the oriented material are moved in the axial direction of the blank by means of mechanical shaping devices consisting of drawing rings that surround the blank and interact during conversion with a mandrel inserted in the blank.

In an alternative version of the invention, conversion starts from an initiating groove in the wall of the blank. A blank in which an initiating groove has been made will hereinafter be called an article. An article is thus an intermediate product formed during conversion of the blank into an object.

The invention provides that the initiating groove is formed by applying external pressure by means of mechanical devices to the amorphous material in the blank in the region where the groove is to be formed while simultaneously applying stretching forces in the axial direction which affect the material in this same region. The mechanical device gradually reduces the thickness of the material in the aforesaid region, which means that the axial stretching force per unit of cross-sectional surface area gradually increases in a cross-section taken through the region where the material thickness is to be reduced. The axial stretching forces are adapted to the properties of the material in such a way that yield occurs in the material at the bottom of the groove when the final stage of groove formation commences. Moreover, the conversion of the blank takes place at a temperature close to or below the glass transition temperature of the blank, hereinafter abbreviated TG. As a rule, the temperature of the blank is considerably below TG, and it should preferbly be at room temperature when the formation of the groove commences. Obviously, the mechanical work carried out in connection with conversion entails an increase in the temperature of the material which, in turn, affects the tendency of the material to yield.

This description explains in detail (a) a method of converting a blank into an article and (b) a device used to form the groove.

The groove in the article comprises the initiation region for subsequent axial orientation of the essentially amorphous material in the article and for axial prolongation of this material to form the object. The thickness of the material at the bottom of the groove after the groove is formed corresponds closely to the thickness which the axially-oriented parts of the object will acquire. One pre-requisite for providing this material-wall thickness when the article is converted to an object is thus that the initial positions of the drawing rings are such that when they are moved in the article's axial direction, they will provide the necessary material reduction and thus the correct object material thickness. In a preferred embodiment of this invention, this is achieved by having the inside of the bottom of the groove largely flush with the inside of the adjacent amorphous material, thus making certain that it will be possible for the drawing rings to assume the aforesaid initial positions.

In an alternative embodiment of this invention, the final forming of the groove is accomplished by having the drawing rings, when being placed in the initial positions, provide the movement of material in the bottom of the groove towards the object's axis that is required to achieve the position of the material wall set forth in the previous paragraph.

Application of this invention provides an article with a peripheral groove arranged in such a way that the thickness of the material in the bottom of the groove is reduced relative to the thickness of the adjacent walls. The wall thickness in the bottom of the groove corresponds to the thickness of a sheet or panel, made of the same amorphous material as that adjacent to the groove and having a thickness corresponding to the thickness of the material of the article adjacent to the groove, obtains when having a temperature corresponding to the temperature which the material at the bottom of the groove has immediately before the final phase of formulation of the groove and the sheet or the panel drawn monoaxially until it yields. The material in the wall at the bottom of the groove has a crystallization in the range 10–30%, preferably in the range 10–17%.

An article having a region of material at the bottom of the groove with an orientation and, sometimes, a supplementary thermal crystallization that causes overall crystallization to the extent mentioned in the previous paragraph is well suited for conversion to an object. As reduction of the wall thickness of the parts of the article adjacent to the groove continues due to the fact that its material is caused to yield, one obtains a region of reduced material thickness consisting of the initial region formed by the bottom of the groove and the adjacent areas having reduced material thickness. The material region thus provided forms, sometimes after supplementary thermal crystallization, an essentially uniform material region both mechanically and thermally. In connection with the production of a bottle, for example, one can permit this material region to form the neck and mouth of the bottle, thus making it possible to provide a bottle having considerably better characteristics with regard to strength and temperature resistance. Moreover, the material thickness in the neck and mouth of the bottle is reduced relative to what is possible with the methods and devices heretofore known.

One special advantage of the groove is that it makes it possible to provide regions of reduced-thickness material arranged symmetrically around the groove. This is important because it permits the article to be used in applications calling for two containers such as bottles arranged opposite each other and produced in one or more operations.

In one embodiment of this invention, successive reduction of the material thickness is accomplished by a number of rollers, although only one roller is used in certain applications. When the groove is formed, the roller or rollers are moved around the periphery of the blank while the distance to the blank axis is gradually reduced and while the material which contacts the roller or rollers is exposed to the aforesaid stretching forces.

In a preferred embodiment of this invention, three rollers are used, and they are brought into contact with the wall of the blank successively and are then moved gradually towards the axis of the blank as the groove is formed. The roller which first contacts the wall of the blank and commences to form the groove has a relatively narrow contact surface. It is followed by the second roller which further deepens and widens the groove while simultaneously reducing the thickness of the material in the bottom of the groove to a value which permits the stretching forces per unit of area to accomplish the aforesaid yield of the material. This provides relatively symmetrical streching of the material while it is simultaneously being thinned, and as a result the inner surface of the material wall at the bottom of the groove is moved slightly away from the axis of the blank. The third roller serves as a shaping roller which moves the material wall to a position at which its inner surface is largely flush with the inner surfaces of the adjacent parts of the material. In an alternative embodiment of this invention, the rollers are replaced by an extended shaping device having an edge against which the blank rolls while the distance of the edge from the axis of the blank is reduced. Preferably, the device terminates in a part having an edge with a width, a length and a position which, because of the movement relative to the blank will affect the material in the bottom of the groove in roughly the same way as set forth for the third roller mentioned in the previous paragraph. The extended shaping device shall preferably be roughly circular and designed in such a way that the shaping edge is on the inside of the ring. This simplifies control, guidance and movement of the blank and also simplifies its movements relative to the shaping device.

During formation of the groove, a central mandrel is usually provided inside the blank. The mandrel has a central part which serves as a support for the wall of the blank in the region where the groove is to be formed. At the two ends of the blank, the mandrel is also provided with sections which also serve as supports for the wall of the blank in order to prevent the blank from being deformed by the fixing devices which grip the blank in connection with the application of the aforesaid stretching forces used to form the groove. Fixing devices are also needed to provide reliable guidance of the blank relative to the shaping device or devices while the groove is being formed.

This invention is intended especially for use in connection with the production of articles made of thermoplastic of the polyester or polyamide type. One example of such a material is polyethylene terephthalate. Other examples are polyhexamethylene-adipamide, polycaprolactam, polyhexamethylene-sebacamide, polyethylene-2.6- and 1,5-naphthalate, polytetramethylene-1,2-dioxybenzoate and copolymers of ethylene terephthlate, ethylene isophthalate and other similar polymer plastics.

The description of this invention is related, for the most part, to polyethylene terephthalate, hereinafter often abbreviated to PET. However, this invention is not limited to the use of this material or any other of the previously mentioned materials. It is applicable for many other thermoplastic materials as well.

The crystallization percentages mentioned previously in connection with PET and which will be mentioned again in connection with PET, are related to the theory set forth in the publication entitled "Die Makromolekulare Chemie" 176, 2459–2465 (1975).

BRIEF DESCRIPTION OF THE DRAWING

This invention is described in greater detail in connection with the following illustrations:

FIGS. 1a–d illustrate the general steps used to form an article from a tubular blank.

FIGS. 2a, b illustrate in detail the final formulation of the groove in the article.

FIG. 3 is a perspective view of one embodiment of the invention.

FIG. 4 is a perspective view of an alternative version of the invention.

FIGS. 5a and 5b respectively illustrates a cross section and a axial section showing details of the embodiment of the invention shown in FIG. 3, particularly the arrangement of the shaping rollers.

FIG. 6 is an axial section showing details of a fixing device and drawing device used in either of the embodiments of this invention shown in FIG. 3 and FIG. 4.

DETAILED DESCRIPTION

FIGS. 1a–d illustrate the principles of this invention as follows. A blank 10 consisting essentially of amorphous material is provided with a peripheral groove 12 throughout a shaping cycle, sometimes called a conversion cycle, in which a number of shaping rollers 31–33 are successively brought to bear against the blank and simultaneously moved peripherally around the blank and also towards the blank axis. Reference numeral 17 indicates a blank in which the formation of the groove has commenced. Reference numeral 18 indicates a blank in which the material in the bottom of the groove has yielded. Reference numeral 19 indicates an article made from blank 10 in which groove 12 has obtained its final form. The letter b at lower right in FIG. 1d represents one half of the elongation of the blank which occurs during conversion to article 19.

A mandrel 20 is provided inside the blank, and it has a central part 22 and outer parts 21a, 21b. The mandrel also has an axis 23 along which the outer parts of the mandrel can be moved. Springs (not shown in the illustrations) tend to keep the outer parts 21a, 21b of the mandrel at the positions shown in FIG. 1a. Moreover, fixing devices 34a, 34b are arranged to hold the outer parts of the blank by clamping them between the fixing device and the outer parts 21a, 21b of the mandrel. The fixing devices are also arranged so that they can be moved in the axial direction of the blank while simultaneously holding the blank securely by means of the aforesaid clamping arrangement. This movement is indicated by arrow H which also indicates the directions of the axial stretching forces which are applied to the material via the fixing devices.

In connection with the application of this invention, blank 10 is threaded over the mandrel until it strikes a stopping surface 35 on fixing device 34a. This provides accurate axial positioning of the blank on the mandrel. The fixing devices grip the ends of the blank, after which the fixing devices are acted on by a driving device to provide stretching forces in the axial direction. Rollers 31–33 are then brought to bear successively on the wall of the blank, and they are moved around the blank's periphery while simultaneously being moved gradually towards the blank axis. Roller 31, which contacts the wall of the blank first and commences to form the groove has a relatively narrow contact surface. It is followed by roller 32, which is brought into contact with the material in such a way as to widen and deepen the shallow groove formed by the first roller. The second roller deepens the groove while simultaneously reducing the thickness of the material in the bottom of the groove to a value which permits the stretching forces applied to the material 15 in the bottom of the groove to cause the material to yield. The material is thus thinned, while its inner surface simultaneously moves slightly away from the central part of the mandrel 22. The third roller 33 which has a shape adapted to the desired final shape of the groove that is intended to be formed then moves the material 15 in the bottom of the groove into contact with the central part of the mandrel 22, whereupon the inner surface of material 15 in the bottom of the groove assumes a position that is largely flush with the adjacent inner surfaces of the article 19 that is formed. When the forming of the groove commences, the material is at a temperature which is considerably below its glass transition temperature (TG).

FIGS. 2a, b present an enlarged, detailed illustration of the final phase of the forming of the groove. In addition to the reference characters used in FIGS. 1a–d, the original thickness of the material wall is indicated by the letter a, and the thickness of the material in the bottom of the groove is indicated by the letter d.

FIG. 3 presents one embodiment of a device used to carry out this invention in which shaping rollers are used as shaping devices. A frame 40 is arranged with a central drive shaft 41 on which are attached a number of holders 43a–d. A stepping motor 42 serves as the driving device for the central drive shaft and moves the conversion stations to the positions marked I–IV in the illustration. The holders support the devices which form the conversion stations in which the blank is converted to an article. In this illustration, and also in FIG. 4, the devices used in the conversion stations are indicated by reference numerals to which the letters a, b, c and d have been appended to indicate that the device in question belongs to a particular conversion station.

A supporting shaft 44 is attached to each holder and supports a first fixing device 67 which, at positions I and IV, is moved by driving device 72 out to the exposed end of supporting shaft 44. Another driving device 74 is connected via lever 78 to this first fixing device 67 in order to secure one end of the blank 10 that is to be converted into article 19. A second fixing device is contained in holder 43. Another driving device 75 is connected via a lever 79 to secure the other end of the blank. A first and second pressure sleeve 97, 98 are provided between the two fixing devices in such a way that they straddle a sleeve 56 which contains shaping rollers 31–33. The illustration also shows driving device 46 which, via levers 47, provides the aforesaid movement of the shaping rollers perpendicular to the axis of the blank. Driving device 76 acts, via a link system and eccentrics 95, move pressure sleeves 97, 98 in the axial direction of the blank. Each conversion station is also provided with its own driving device 45 which rotates mandrel 20 and thus the blank which is secured to the mandrel by means of fixing devices 67, 68.

FIG. 3 also shows a feed device for blanks 10. This device feeds the blanks into the first fixing device 67 when the conversion station is at position I. Feed wheels 65, in combination with blank carrier 64 and a feed/discharge device 66 are all a part of the feed device.

FIG. 4 shows an alternative embodiment of a device used for the application of this invention in which the shaping rollers are replaced by an extended shaping device 60 with an edge 61. This edge forms a roughly circular limiting surface which has a varying width and varying distance from the centre of rotation. A part of the limiting surface must have a length corresponding to at least the circumference of the blank. Moreover, this part of the limiting surface must have a shape which corresponds to the shape which the groove is to have when conversion into an article is completed.

Shaping device 60 is arranged as a roughly circular holder 59. The driving device (not shown in the illustration) can rotate the shaping device around its axis.

Frame 63 is arranged on base 62. The frame has a centrally located hole 58. Feed wheels 65, blank carrier 64 and feed/discharge device 66 are arranged relative to the hole in accordance with the description of FIG. 3.

A number of supporting arms 69 (four in this illustration) are arranged relative to frame 63 and on sliding shafts 70 by means of a bearing 71 in such a way that the supporting arms can be moved from one position adjacent to frame 63 to another position close to shaping device 60 and back again to the first position. At the other end, each supporting arm is provided with a first fixing device 67 which corresponds to the first fixing device mentioned in the description of FIG. 3. Sliding shaft 70 is also carried on bearing 71 in frame 63 so that, by means of driving device 73, it can be turned between one position in which the first fixing device 67 is located at the center of hole 58 and a second position that corresponds approximately to the position of edge 61 on shaping device 60.

Supporting devices 69 are attached to the frame 63. Devices 69 have each a first fixing device 67, which interacts with a second fixing device 68 arranged adjacent to two pressure sleeves 98, 97. The second fixing device and the pressure sleeves, together with the first fixing device form a conversion station for blank 10 when the first fixing device 67 is moved to a position adjacent to shaping device 60. Driving devices 74–76 with their link system are provided for fixing devices 67, 68 and for pressure sleeves 97, 98 in the same way as shown in FIG. 3. The reference numerals for these link systems are the same as the reference numerals used in FIG. 3. Reference numeral 78 indicates a lever for the first fixing device 67. Reference numeral 79 indicates a lever for the second fixing device 68.

FIG. 5b shows section 5b–5b in FIG. 5a, i.e. a section taken along blank 10's axis in a device like the one shown in FIG. 4. FIGS. 5a, b illustrates the structure of a shaping device that consists of shaping rollers. Circular housing 50 contains supporting device 48 on which lever 47 is attached. The supporting device can rotate in housing 50. A number of guide rollers 49 are carried on supporting device 48 and follow it when it moves. Shaping rollers 31–33 are carried in roller holder 51. The roller holder has a guide surface 52 against which each of guide rollers 49 roll. The roller holders can rotate around pivot point 53. A spring 54 returns the roller holders to their initial positions so that blank 10 can be fed in between the rollers. Roller holders 51 are mounted on a ring 55 which is attached to circular housing 50. FIG. 6 presents a section taken in the axial direction of blank 10 through the part of the conversion station which secures one of the ends of the blank. In this illustration, the blank has been threaded onto the mandrel.

Reference numeral 25 indicates an extension of the mandrel axis 23. This extension is carried in bearing 99. In a version of this invention in which shaping rollers are used, extension 25 is connected to the driving device (e.g. driving device 45 in FIG. 3), while in an alternative enbodiment where shaping is carried out by means of an extended shaping device, the mandrel runs freely in bearing 99. Reference numeral 81 indicates a fixed sleeve in which bearing 99 and the other devices located adjacent to the fixing devices and stretching devices used for blank 10 are mounted.

The aforesaid lever 79 is attached to transmission device 82. When the lever moves, transmission device 82 is screwed into threaded member 83 and simultaneously pulls tapered device 94 in and over fixing jaws 85. As a result, the blank is securely clamped between the fixing jaws and the outer part of mandrel 21. The fixing jaws are arranged in a holder 38. Bearings 87, 84 permit holder 38 and the tapered device 94 to rotate when blank 10 rotates.

The aforesaid lever 88 is attached to actuator 89 which, when the lever moves, is screwed out of holder 90 and moves a pressure sleeve 91 against part 83 which, in turn, moves into the fixed sleeve. This exerts a pulling force on blank 10 via fixing jaws 85. Part 83 is prevented from rotating by stop pin 93.

When a blank 10 is converted into an article 19 by means of the embodiment of the invention shown in FIG. 3, blank 10 is fed by means of feed wheels 65, blank carrier 64 and feed/discharge device 66, whereupon the feeding operation is terminated by a shoulder in the first fixing device 67a. Driving device 74 actuates the fixing device so that the blank is secured firmly by the first fixing device. Simultaneously, the first fixing device is actuated by driving device 72a in such a way that it moves into contact with the first pressure sleeve 97. Also simultaneously, the blank is inserted between shaping rollers 31-33 (see FIG. 5a, b). Also simultaneously, the other end of the blank is moved against stopping surface 35 in the second fixing device 68a (hidden in the illustration). Driving device 75 then actuates the second fixing device so that it secures the other end of the blank.

When driving device 46a, which provides movement of the shaping rollers towards the axis of the blanks is actuated, the shaping rollers are moved as described above in connection with FIG. 5a, b in order to form groove 12. Driving device 76a, when it is actuated, exposes the material to stretching forces in the same way as described previously. Then, when the thickness of the material in the bottom of the groove reaches a predetermined value, it will yield. As a result, the blank is stretched. Conversion to an article is then concluded when shaping roller 33 moves the material in the bottom of the groove into contact with the mandrel thus determining the final shape of the groove. Relative movement between the shaping rollers on the one hand and the blank on the other is provided by driving device 45a, after the two ends of the blank have been secured in the first and second fixing devices by that the driving device 45a rotates the mandrel and thus rotates the blank itself.

While the cycle described above is being carried out, stepping motor 42 moves the conversion station step by step from position I to position IV, as shown in the illustration.

At position IV, the shaping rollers are returned to their initial positions, and the second fixing device releases the blank. Thereafter, driving device 72a moves the first fixing device 67a back to its initial position. Driving device 74a returns to its initial position and releases the end of the article, after which a new blank 10 can be moved in the axial direction into the first fixing device while article 19a is simultaneously discharged.

The above description has explained how a conversion station is used to convert a blank to an article. Each of the conversion stations converts one blank in the same manner as set forth above. Even though the illustration shows four conversion stations, it is possible to arrange a device like the one shown in FIG. 3 with more or fewer conversion stations.

Moreover, the description refers to the use of three shaping rollers which successively shape the groove. Depending upon the way in which, for example, the width and shape of the groove are to be formed, it is possible within the scope of this invention to use either more or fewer shaping rollers.

When converting a blank 10 into an article 19 using the embodiment of the invention shown in FIG. 4, blank 10 is fed in the same way as described in connection with FIG. 3, after which the first fixing device 67a is moved by driving device 73a to the position shown by the broken lines in FIG. 3. Driving device 72a then moves the fixing device to a position adjacent to the extended shaping device 60 where, together with the second fixing device 68a and the intermediate devices such as actuator 89 and holder 90. it forms the composite device used to secure the blank while it is being converted to an article.

Now, the other end of the blank is secured in the same way as described in connection with FIG. 6, whereupon the material in the region where the groove is to be formed is exposed to axial stretching forces.

The drive devices rotate the extended shaping device 60 which, when the blank was moved to the aforesaid position assumed a position at which edge 61 did not obstruct axial movement of the blank. As rotation proceeds, edge 61 is gradually moved closer to the centre of the blank, wherewith the blank rolls against the edge while the groove is being formed. In the same way as described previously, the material at the bottom of the groove yields after a certain time interval. The final shape of the groove is then determined by having the material in the bottom of the groove contact an edge shaped and located in such a way that the material wall is pressed against the central part of the mandrel throughout at least one full revolution of the blank. This procedure provides the final shape of the groove.

As the rotation of the extended shaping device continues, edge 61 moves away from the material in the newly-formed article, and the second fixing device releases the article, after which the first fixing device is moved to its initial position. The article is then released and a new blank is moved axially into the first fixing device while the article that was formed is simultaneously discharged.

In this embodiment of the invention, it is also possible to provide more or fewer conversion stations than shown in the illustration.

The material in the bottom of the groove becomes crystallized to a maximum value of approximately 17%, which through supplementary thermal crystallization can provide a maximum value of approximately 30% without causing problems when the article is subsequently shaped into new products.

This invention is intended especially for application in connection with the production of articles made of thermoplastic material of the polyester or polyamide types. Examples of such materials were presented in the introductory part of this description.

We claim:

1. A device for producing a tubular article with a peripheral groove from a tubular blank having a wall of essentially amorphous material, comprising fixing means for fixedly engaging the wall of the blank on both sides of a region in which the groove is to be formed and for axial movement in opposite directions while maintaining secure engagement with the wall of the blank to produce axial stretching forces in the blank, and mechanical shaping means for contacting and compressing the wall of the blank in the region in which the groove is to be formed while undergoing movement peripherally around the blank and also perpendicular to the axis of the blank such that said groove is formed in the wall of the blank with gradually increasing depth and the axial stretching forces applied by said fixing means to the material in the bottom of the groove causes the material to yield while its thickness is simultaneously reduced.

2. A device as claimed in claim 1 wherein said mechanical shaping means comprises at least one roller having an axial parallel to the axis of the blank.

3. A device as claimed in claim 1 wherein said mechanical shaping means comprises an elongated shaping device having a shaping edge against which the blank rolls while the distance to the axis of the blank axis is gradually reduced.

4. A device as claimed in claim 1 comprising an internal mandrel insertable into said blank to form a supporting surface for said wall upon application of said shaping means and fixing means to form said groove.

5. A device as claimed in claim 4 wherein said mandrel includes a central part and two outer parts each movable relative to the central part of the mandrel.

6. A device as claimed in claim 5 wherein said outer parts of the mandrel are shaped relative to the inside of the tubular blank to permit the mandrel to be placed inside the blank such that the central and outer parts of the mandrel provide supporting surfaces for the wall of the blank when the shaping means and the fixing means convert the blank to the article.

* * * * *